US012496835B2

(12) United States Patent
Ono

(10) Patent No.: US 12,496,835 B2
(45) Date of Patent: Dec. 16, 2025

(54) PRINTER, METHOD FOR CONTROLLING PRINTER, AND METHOD FOR MANUFACTURING PRINTED MATTER

(71) Applicant: DAI NIPPON PRINTING CO., LTD., Tokyo (JP)

(72) Inventor: Katsuhisa Ono, Tokyo (JP)

(73) Assignee: Dai Nippon Printing, Co., Ltd., Tokyo (JP)

( * ) Notice: Subject to any disclaimer, the term of this patent is extended or adjusted under 35 U.S.C. 154(b) by 197 days.

(21) Appl. No.: 18/253,437

(22) PCT Filed: Feb. 24, 2022

(86) PCT No.: PCT/JP2022/007725
§ 371 (c)(1),
(2) Date: May 18, 2023

(87) PCT Pub. No.: WO2022/181718
PCT Pub. Date: Sep. 1, 2022

(65) Prior Publication Data

US 2023/0406005 A1 Dec. 21, 2023

(30) Foreign Application Priority Data

Feb. 25, 2021 (JP) ................................ 2021-029091

(51) Int. Cl.
*B41J 2/325* (2006.01)
*B41J 2/005* (2006.01)
(Continued)

(52) U.S. Cl.
CPC ............ *B41J 2/325* (2013.01); *B41J 2/0057* (2013.01); *B41J 3/36* (2013.01); *B41J 11/04* (2013.01);
(Continued)

(58) Field of Classification Search
CPC . B41J 2/325; B41J 2/0057; B41J 11/04; B41J 11/68; B41J 11/70; B41J 15/20; B41J 2002/0052; B41J 3/36
See application file for complete search history.

(56) References Cited

U.S. PATENT DOCUMENTS 5,783,024 A * 7/1998 Forkert .................... B26D 5/16 156/364
2020/0307271 A1* 10/2020 Koda ..................... B41J 11/663

FOREIGN PATENT DOCUMENTS

JP H06-114795 A 4/1994
JP 2003080756 A * 3/2003 ............. B41J 2/365
(Continued)

OTHER PUBLICATIONS

International Search Report and Written Opinion (Application No. PCT/JP2022/007725) dated Apr. 12, 2022.
(Continued)

*Primary Examiner* — Yaovi M Ameh
(74) *Attorney, Agent, or Firm* — BURR PATENT LAW, PLLC

(57) ABSTRACT

A printer includes a transferee object sending unit configured to send out a transferee object downstream, a transfer film sending unit configured to send out a transfer film downstream, a printing device situated downstream of the transfer film sending unit and configured to print a transferred image onto the transfer film, a holding unit situated downstream of the transferee object sending unit and the printing device and configured to hold the transferee object and the transfer film on top of each other so that a surface of the transfer film on which the transferred image is printed faces the transferee object and to send out the transferee object and the transfer film downstream, and a pasting unit situated downstream of the holding unit and configured to
(Continued)

paste the transfer film onto the transferee object with the transferred image printed on the transfer film.

7 Claims, 10 Drawing Sheets

(51) Int. Cl.

| | |
|---|---|
| ***B41J 3/36*** | (2006.01) |
| ***B41J 11/04*** | (2006.01) |
| ***B41J 11/68*** | (2006.01) |
| ***B41J 11/70*** | (2006.01) |
| ***B41J 15/20*** | (2006.01) |

(52) U.S. Cl.
CPC ................ *B41J 11/68* (2013.01); *B41J 11/70* (2013.01); *B41J 15/20* (2013.01); *B41J 2002/0052* (2013.01)

(56) References Cited

FOREIGN PATENT DOCUMENTS

| | | | | |
|---|---|---|---|---|
| JP | 2005335219 A | * 12/2005 | .............. | B41J 2/325 |
| JP | 2008044130 A | * 2/2008 | ................ | B41J 3/54 |
| JP | 2017-080934 A | 5/2017 | | |
| JP | 2019-130692 A | 8/2019 | | |

OTHER PUBLICATIONS

Japanese Office Action (Application No. 2021-029091) dated Oct. 21, 2022 (with English translation).
Japanese Office Action (Application No. 2021-029091) dated Jan. 6, 2023 (with English translation).
English translation of the International Preliminary Report on Patentability (Chapter I) dated Sep. 7, 2023 (Application No. PCT/JP2022/007725).

* cited by examiner

[Fig.1]
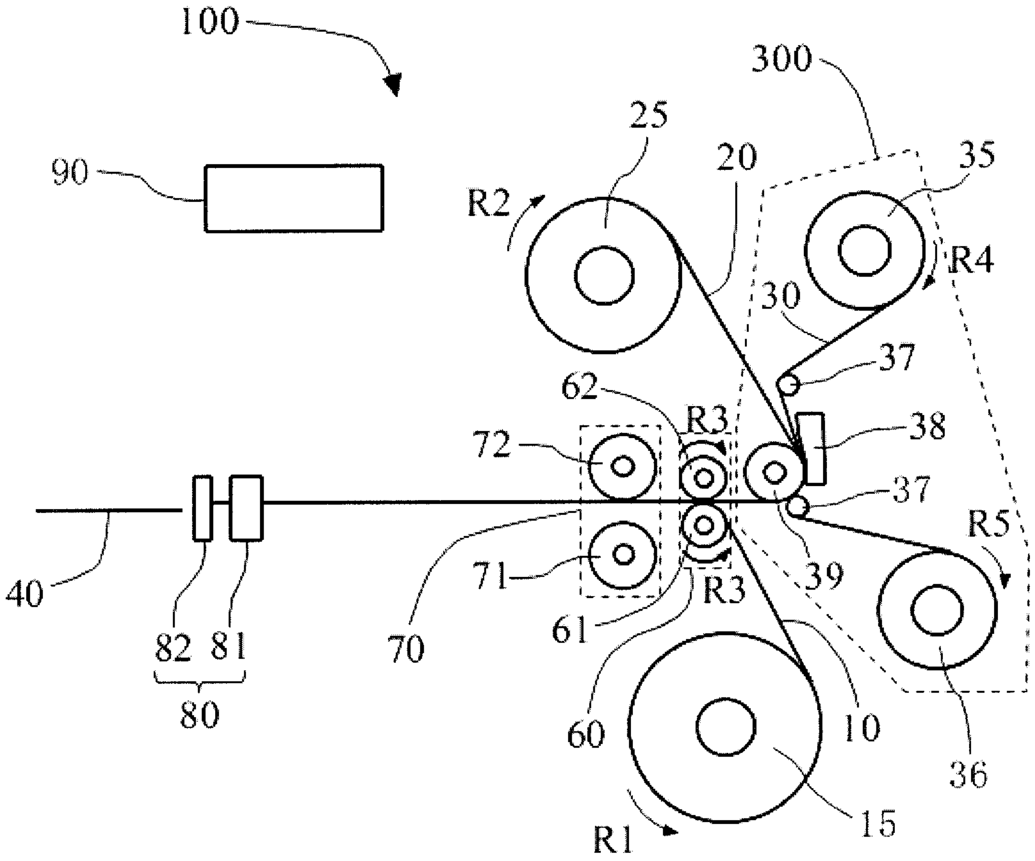
[Fig.2]
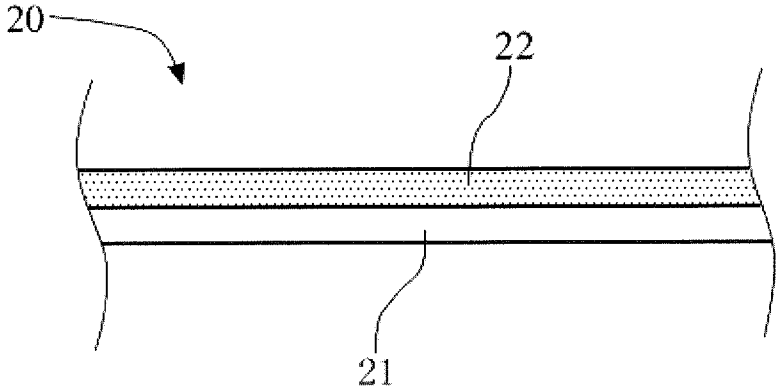

[Fig.3]
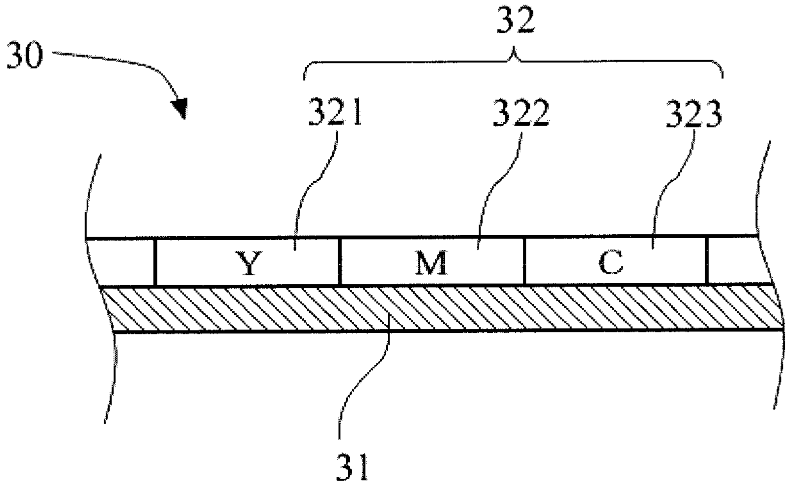
[Fig.4]
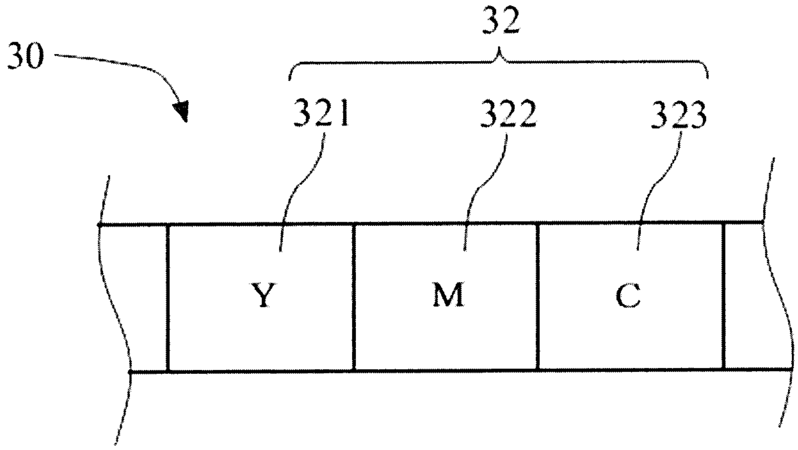

[Fig.5]
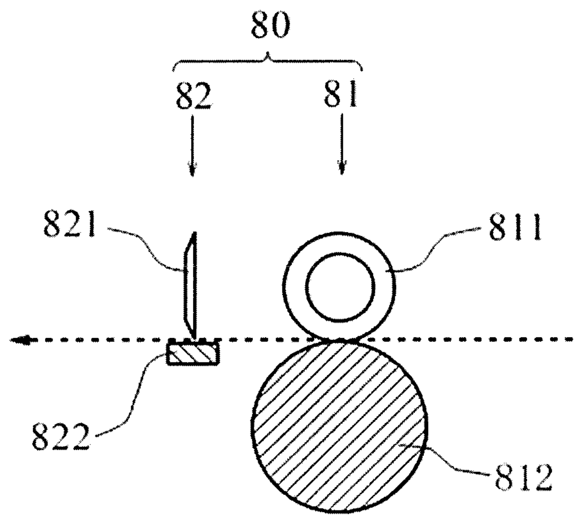
[Fig.6]
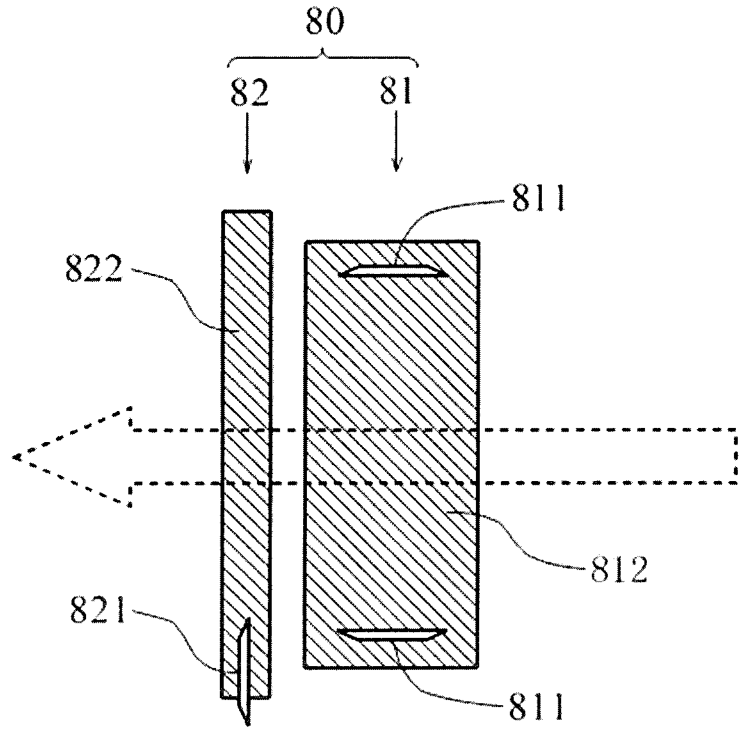

[Fig.7A]
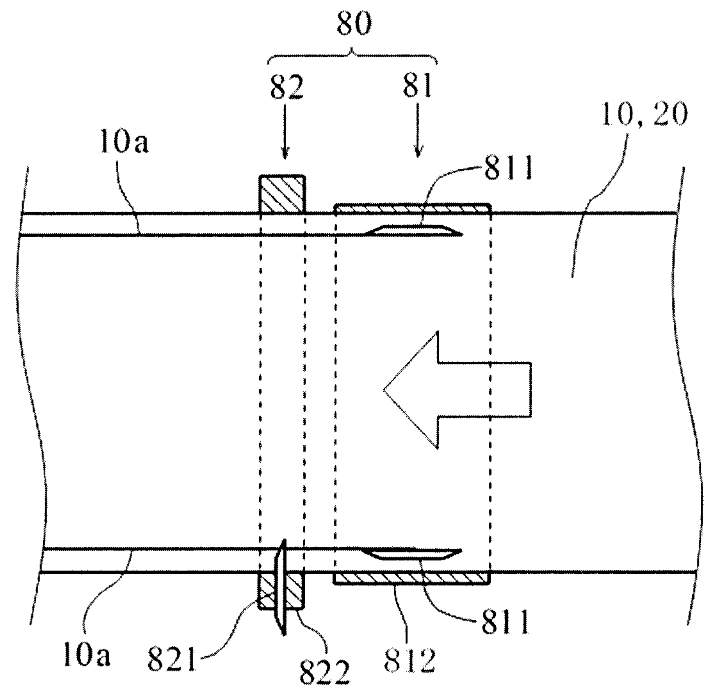
[Fig.7B]
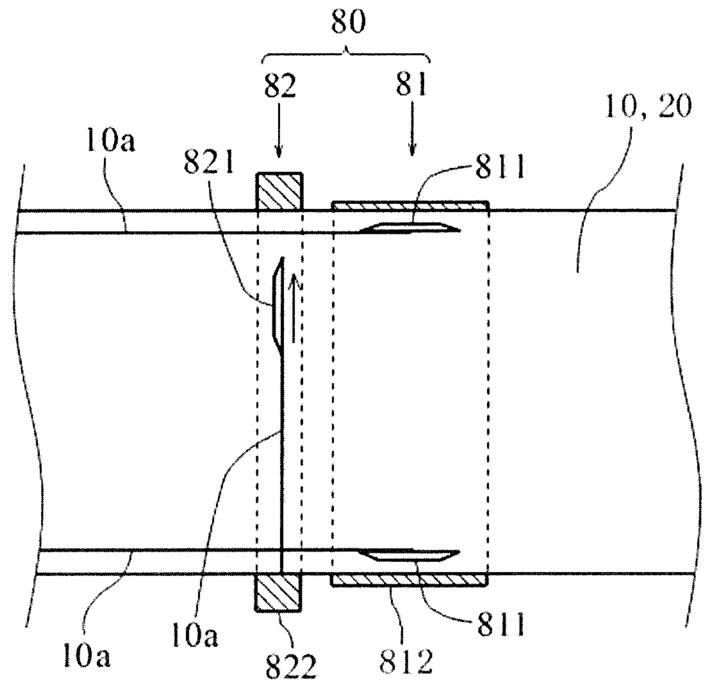

[Fig.8]
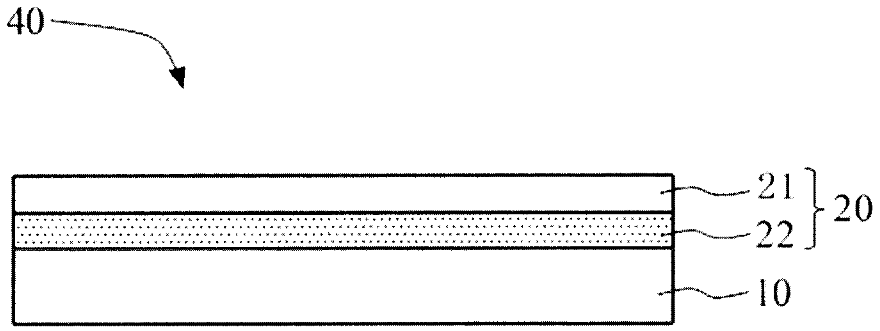

[Fig.9]
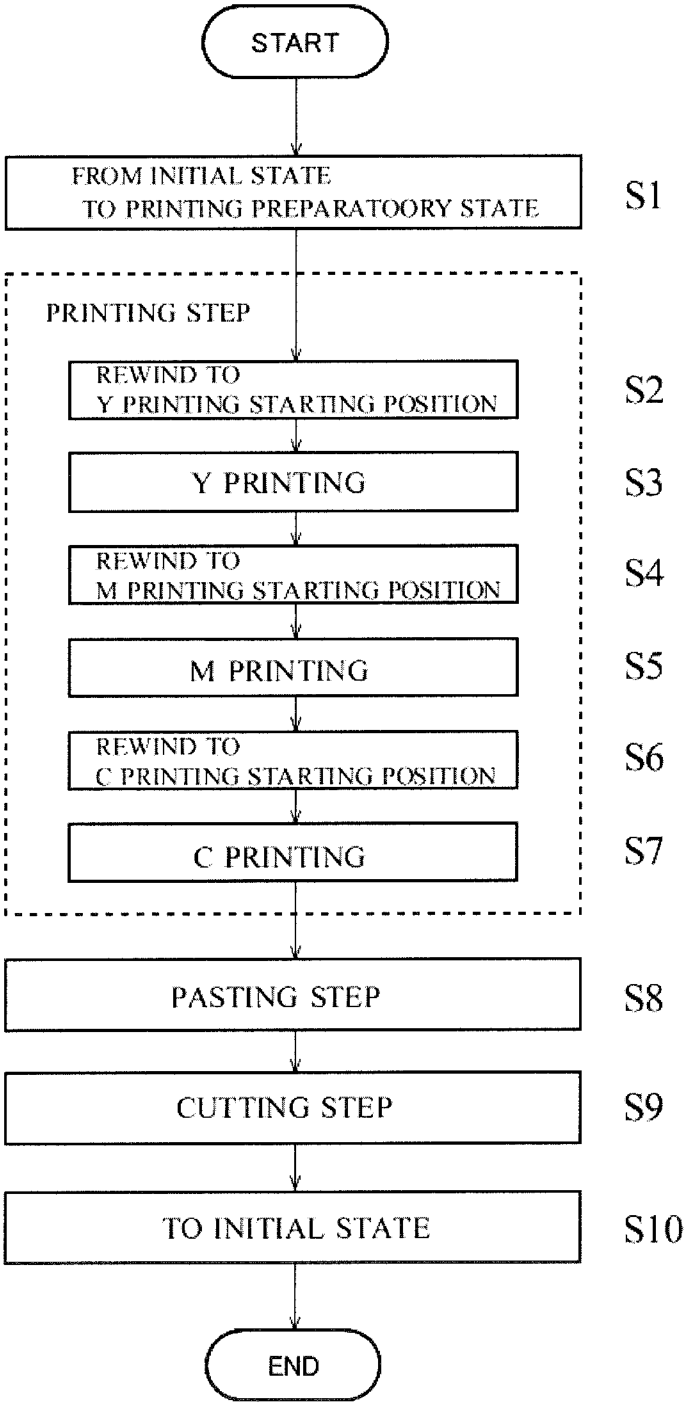

[Fig.10A]
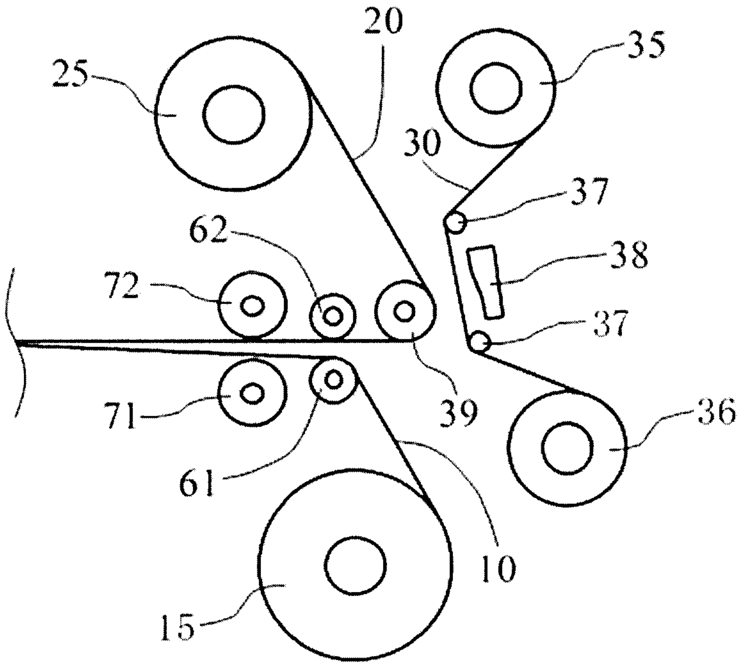
[Fig.10B]
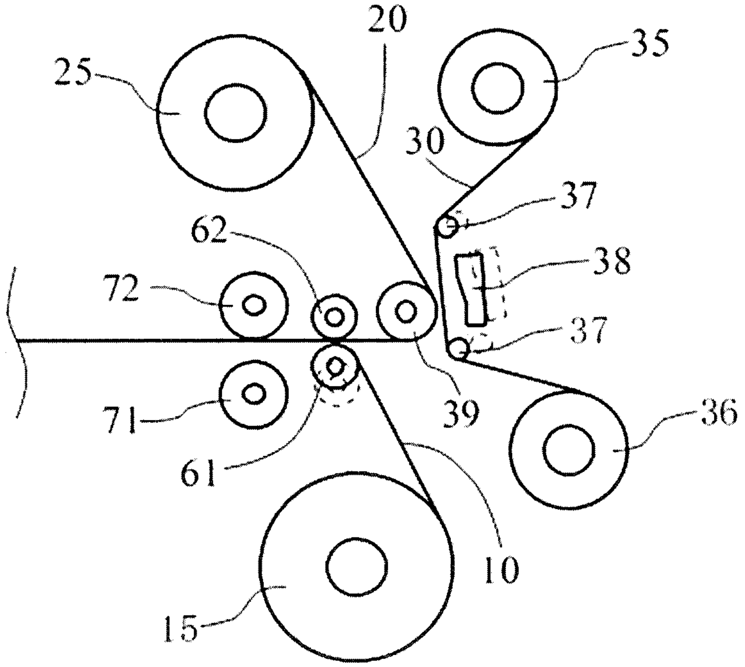

[Fig 10C]
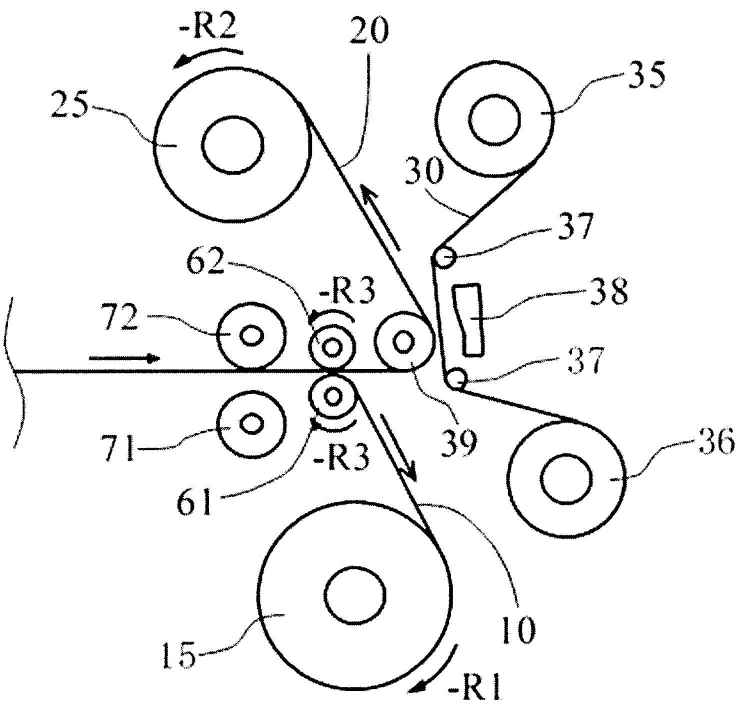
[Fig.10D]
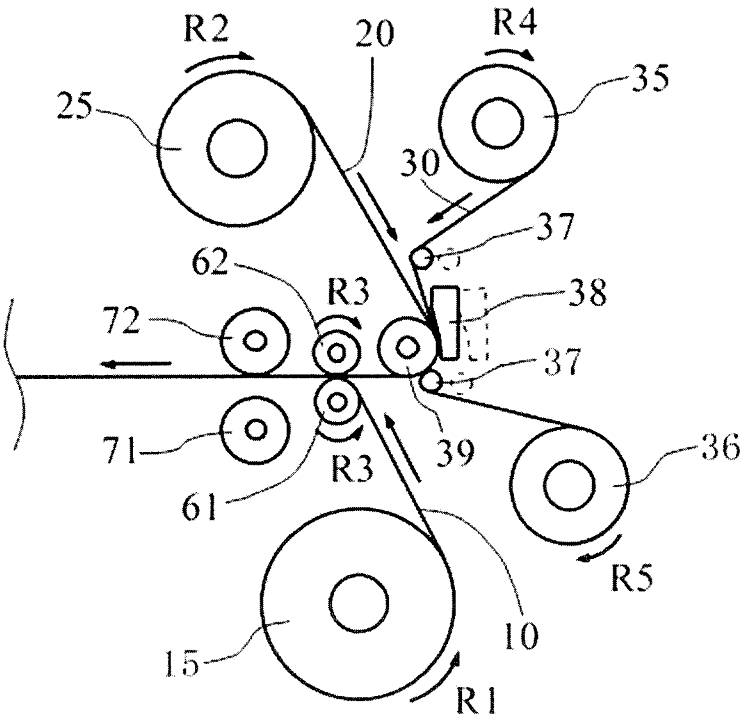

[Fig.10E]
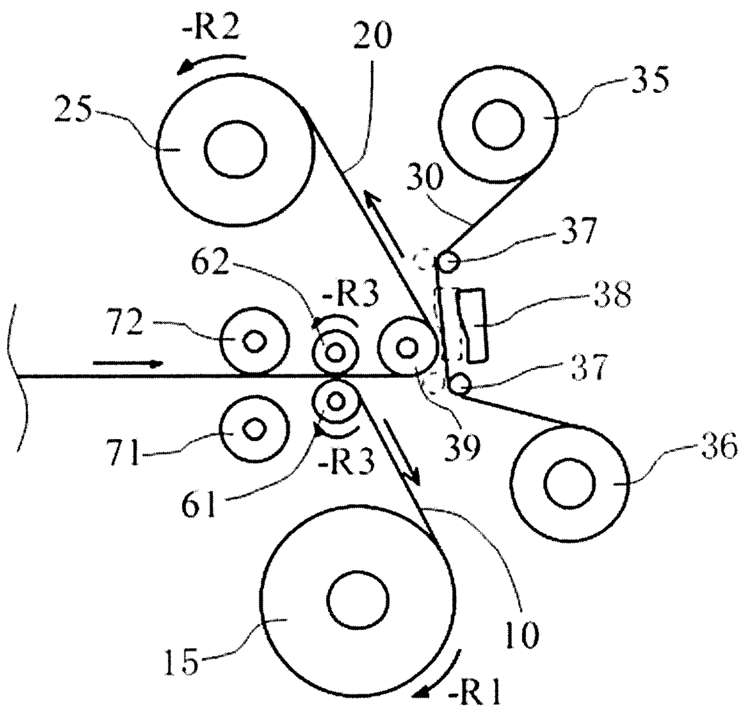
[Fig.10F]
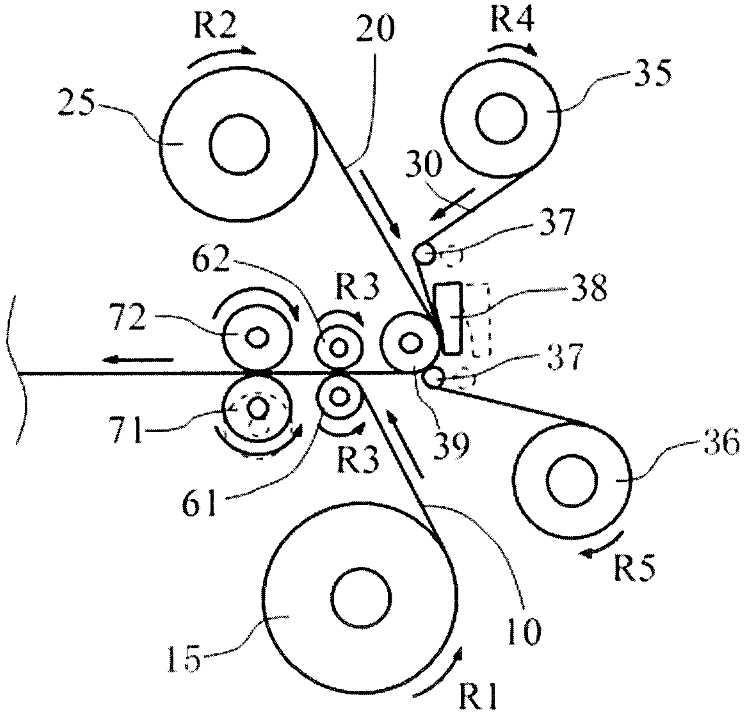

[Fig.10G]
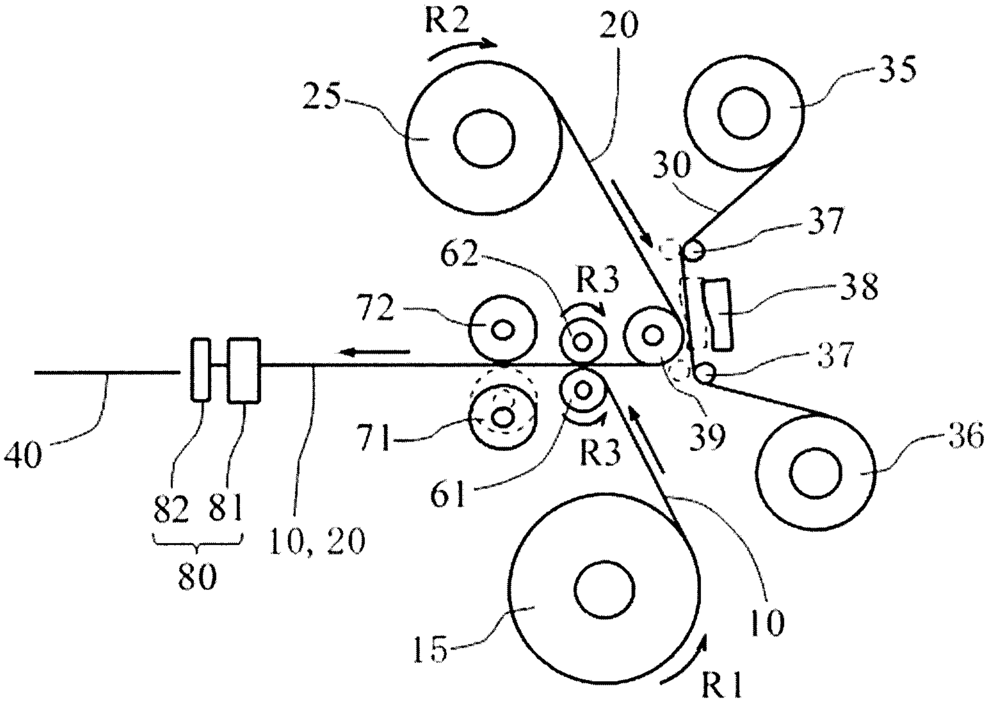

PRINTER, METHOD FOR CONTROLLING PRINTER, AND METHOD FOR MANUFACTURING PRINTED MATTER

TECHNICAL FIELD

The present disclosure relates to a novel type of printer, a method for controlling the printer, and a method for manufacturing a printed matter that is obtained through the printer.

BACKGROUND ART

As printers that print images or other pictures onto transferee objects such as sheets of printing paper, types of printer that transfer inks of ink ribbons onto transferee objects have been widely used. Further, as in the case of PTL 1, there is a type of printer that transfers inks of an ink ribbon onto an intermediate transfer medium and retransfers, onto a transferee object, the inks transferred onto the intermediate transfer medium.

CITATION LIST

Patent Literature

PTL 1: Japanese Unexamined Patent Application Publication No. 2019-130692

SUMMARY OF INVENTION

Technical Problem

The disclosers of the present disclosure diligently studied to determine the possibility of a novel type of printer and developed a printer that makes it possible to obtain a printed matter of high design quality. The present disclosure has as an object to provide a printer that makes it possible to obtain a printed matter of high design quality.

Solution to Problem

A printer according to the present disclosure includes a transferee object sending unit configured to send out a transferee object downstream, a transfer film sending unit configured to send out a transfer film downstream, a printing device situated downstream of the transfer film sending unit and configured to print a transferred image onto the transfer film, a holding unit situated downstream of the transferee object sending unit and the printing device and configured to hold the transferee object and the transfer film on top of each other so that a surface of the transfer film on which the transferred image is printed faces the transferee object and to send out the transferee object and the transfer film downstream, and a pasting unit situated downstream of the holding unit and configured to paste the transfer film onto the transferee object with the transferred image printed on the transfer film.

In the printer, the holding unit may be able to send out the transferee object and the transfer film upstream as well as downstream. The printer may further include a cutting unit configured to cut off both ends of a pasted combination of the transferee object and the transfer film along a direction of conveyance of the transferee object and then cutting the pasted combination of the transferee object and the transfer film along a direction orthogonal to the direction of conveyance of the transferee object. The holding unit may include two paired pinch rollers placed opposite each other. The pasting unit may include two paired heat rollers placed opposite each other.

A method for controlling a printer according to the present disclosure includes a printing step of printing a transferred image onto a transfer film through a printing device and a pasting step of pasting the transfer film onto a transferee object with the transferred image printed on the transfer film. The printing step includes a step in which the printing device prints the transferred image onto the transfer film while a holding unit situated downstream of the printing device and configured to hold the transferee object and the transfer film on top of each other so that a surface of the transfer film on which the transferred image is printed faces the transferee object is sending out the transferee object and the transfer film downstream.

In the method for controlling a printer, the printing step further includes a step of, before the transferred image is printed onto the transfer film, rewinding the transfer film to a printing starting position while the holding unit is sending out the transferee object and the transfer film upstream. The method for controlling a printer may further include a cutting step of cutting a pasted combination of the transferee object and the transfer film. The cutting step may include a step of cutting off both ends of the pasted combination of the transferee object and the transfer film along a direction of conveyance of the transferee object and a step of cutting the pasted combination of the transferee object and the transfer film along a direction orthogonal to the direction of conveyance of the transferee object.

A method for manufacturing a printed matter according to the present disclosure is a method for manufacturing a printed matter using a printer including a transferee object sending unit configured to send out a transferee object downstream, a transfer film sending unit configured to send out a transfer film downstream, a printing device situated downstream of the transfer film sending unit and configured to print a transferred image onto the transfer film, a holding unit situated downstream of the transferee object sending unit and the printing device and configured to hold the transferee object and the transfer film on top of each other so that a surface of the transfer film on which the transferred image is printed faces the transferee object, and a pasting unit situated downstream of the holding unit and configured to paste the transfer film onto the transferee object, the method including: a printing step of printing the transferred image onto the transfer film through the printing device; and a pasting step of pasting the transfer film onto the transferee object with the transferred image printed on the transfer film by the pasting unit, wherein the printing step includes a step in which the printing device prints the transferred image onto the transfer film while the holding unit is sending out the transferee object and the transfer film downstream.

In the method for manufacturing a printed matter, the printing step may further include a step of, before the transferred image is printed onto the transfer film, rewinding the transfer film to a printing starting position while the holding unit is sending out the transferee object and the transfer film upstream. The method for manufacturing a printed matter may further include a cutting step of cutting a pasted combination of the transferee object and the transfer film. The cutting step may include a step of cutting off both ends of the pasted combination of the transferee object and the transfer film along a direction of conveyance of the transferee object and a step of cutting the pasted combination of the transferee object and the transfer film along a direction orthogonal to the direction of conveyance of the transferee object.

Advantageous Effects of Invention

The printer of the present disclosure makes it possible to obtain a printed matter of high design quality.

BRIEF DESCRIPTION OF DRAWINGS

FIG. 1 is a front view schematically showing a printer of the present embodiment.

FIG. 2 is a longitudinal sectional view of a transfer film of the present embodiment.

FIG. 3 is a longitudinal sectional view of an ink ribbon that is used in a printing device of the present embodiment.

FIG. 4 is a longitudinal sectional view of the ink ribbon that is used in the printing device of the present embodiment.

FIG. 5 is a front view showing a cutting unit of a printer of the present embodiment.

FIG. 6 is a top view showing the cutting unit of the printer of the present embodiment.

FIG. 7A is a top view showing an action of the cutting unit of the printer of the present embodiment, and shows a mode of cutting by a first cutting unit.

FIG. 7B is a top view showing an action of the cutting unit of the printer of the present embodiment, and shows a mode of cutting by a second cutting unit.

FIG. 8 is a longitudinal sectional view of a printed matter of the present embodiment.

FIG. 9 is a flow chart showing a method for controlling a printer of the present embodiment.

FIG. 10A is a front view showing an action of the printer of the present embodiment, and shows an initial state.

FIG. 10B is a front view showing an action of the printer of the present embodiment, and shows a preparatory state.

FIG. 10C is a front view showing an action of the printer of the present embodiment, and shows a state in which a transfer film is being rewound to a Y printing starting position.

FIG. 10D is a front view showing an action of the printer of the present embodiment, and shows a state in which Y (M) printing is being executed.

FIG. 10E is a front view showing an action of the printer of the present embodiment, and shows a state in which the transfer film is being rewound to an M (C) printing starting position.

FIG. 10F is a front view showing an action of the printer of the present embodiment, and shows a state in which C printing is being executed and the transfer film is being pasted onto a transferee object.

FIG. 10G is a front view showing an action of the printer of the present embodiment, and shows a state in which a stacked combination of the transferee object and the transfer film is being conveyed to the cutting unit and cut into a printed matter being ejected.

DESCRIPTION OF EMBODIMENTS

The following describes an embodiment of the present disclosure (hereinafter referred to as "present embodiment") with reference to the drawings.

FIG. 1 is a front view schematically showing a printer 100 of the present embodiment.

The printer 100 of the present embodiment includes a transferee object sending unit 15, a transfer film sending unit 25, a printing device 300, a holding unit 60, a pasting unit 70, a cutting unit 80, and a control unit 90. The printing device 300 is situated downstream of the transfer film sending unit 25. The holding unit 60 is situated downstream of the transferee object sending unit 15 and the printing device 300. The pasting unit 70 is situated downstream of the holding unit 60. The cutting unit 80 is situated downstream of the pasting unit 70.

The transferee object sending unit 15 sends out a transferee object 10 downstream. The transferee object 10 of the present embodiment is a roll of printing paper. The transferee object sending unit 15 sends out the transferee object 10 downward by rotating in a direction (R1 direction) indicated by arrow R1 in FIG. 1. Further, the transferee object sending unit 15 is configured to be able to roll up the transferee object 10 by rotating in a direction (−R1 direction) opposite to the R1 direction. The transferee object sending unit 15 is driven, for example, by a stepping motor.

The transfer film sending unit 25 sends out the aftermentioned transfer film 20 downstream by rotating in a direction (R2 direction) indicated by arrow R2 in FIG. 1. Further, the transfer film sending unit 25 can roll up the transfer film 20 by rotating in a direction (−R2 direction) opposite to the R2 direction. The transfer film sending unit 25 is driven, for example, by a stepping motor.

As will be described later, the printing device 300 prints a transferred image onto the transfer film 20 by transferring inks of an ink ribbon 30 onto the transfer film 20.

The holding unit 60 holds the transferee object 10 and the transfer film 20 on top of each other so that a surface of the transfer film 20 on which the transferred image is printed faces the transferee object 10. Furthermore, the holding unit 60 sends out the transferee object 10 and the transfer film 20 downstream. The holding unit 60 of the present embodiment is configured to be able to send out the transferee object 10 and the transfer film 20 upstream as well as downstream so that the transferee object 10 and the transfer film 20 may be rewound.

It should be noted that the sending out of the transferee object 10 and the transfer film 20 by the holding unit 60, the sending out and rolling up of the transferee object 10 by the transferee object sending unit 15, and the sending out and rolling up of the transfer film 20 by the transfer film sending unit 25 are controlled so as to be synchronized with one another.

The holding unit 60 of the present embodiment includes two paired pinch rollers 61 and 62 placed opposite each other. The holding unit 60 holds the transferee object 10 and the transfer film 20 on top of each other between the two paired pinch rollers 61 and 62. Further, the holding unit 60 sends out the transferee object 10 and the transfer film 20 downstream or upstream by rotating the pinch rollers 61 and 62 while keeping holding the transferee object 10 and the transfer film 20.

The pinch rollers 61 and 62 assume a holding position (as indicated in FIG. 1) and a stop-holding position (as indicated in FIG. 10A). The holding position is a position in which the pinch rollers 61 and 62 hold the transferee object 10 and the transfer film 20 on top of each other. The stop-holding position is a position in which the pinch rollers 61 and 62 stop holding the transferee object 10 and the transfer film 20. The pinch rollers 61 and 62 send out the transferee object 10 and the transfer film 20 downstream by assuming the holding position and rotating in a direction (R3 direction) indicated by arrow R3 in FIG. 1. Further, the pinch rollers 61 and 62 send out the transferee object 10 and the transfer film 20 upstream by assuming the holding position and rotating in a direction (−R3 direction) opposite to the R3 direction. The pinch rollers 61 and 62 are driven, for example, by a stepping motor.

The pasting unit 70 pastes the transfer film 20 onto the transferee object 10 by pressing the transferee object 10 and the transfer film 20 against each other in the presence of the application of heat.

The pasting unit 70 of the present embodiment includes two paired heat rollers 71 and 72 placed opposite each other. The pasting unit 70 pastes the transfer film 20 onto the transferee object 10 by pressing the transferee object 10 and the transfer film 20 against each other in the presence of the application of heat while the transferee object 10 and the transfer film 20 are passing through the space between the two paired heat rollers 71 and 72.

The heat rollers 71 and 72 assume a pressing position (as indicated in FIG. 10F) and a stop-pressing position (as indicated in FIG. 1). The pressing position is a position in which the heat rollers 71 and 72 press the transferee object 10 and the transfer film 20 against each other. The stop-pressing position is a position in which the heat rollers 71 and 72 stop pressing the transferee object 10 and the transfer film 20 against each other. The heat rollers 71 and 72 paste the transfer film 20 onto the transferee object 10 when assuming the pressing position.

It should be noted that although, in the illustrated example, the pasting unit 70 includes the two paired heat rollers 71 and 72, the pasting unit 70 of the present disclosure may include a heat roller and a pressure roll that are placed opposite each other. Note, however, that from the point of view of performing sufficient heating even via a supporting layer 21 of the transfer film 20, it is preferable that the pasting unit 70 of the present disclosure include the two paired heat rollers 71 and 72.

As will be described later, the cutting unit 80 cuts off both ends of a pasted combination of the transferee object 10 and the transfer film 20 along a direction of conveyance of the transferee object 10, cutting the pasted combination of the transferee object 10 and the transfer film 20 along a direction orthogonal to the direction of conveyance of the transferee object 10, and then ejects the pasted combination of the transferee object 10 and the transfer film 20 as a printed matter 40 in the form of a sheet.

The control unit 90 controls the actions of the transferee object sending unit 15, the transfer film sending unit 25, the printing device 300, the holding unit 60, the pasting unit 70, and the cutting unit 80 by outputting control signals to driving units that separately drive each of these components.

FIG. 2 is a longitudinal sectional view of a transfer film 20 of the present embodiment.

The transfer film 20 includes a supporting layer 21 and a receptive layer 22 joined on top of the supporting layer 21.

The supporting layer 21 is a transparent layer, and appropriately supports the receptive layer 22 joined on top of the supporting layer 21. The supporting layer 21 is constituted, for example, by various types of resin having sufficient heat resistance and strength to withstand transfer.

The receptive layer 22 is a layer onto which inks of an ink ribbon 30 are transferred by the printing device 300. The receptive layer 22 is constituted, for example, by various types of resin that are capable of receiving the inks of the ink ribbon 30.

FIG. 3 is a longitudinal sectional view of an ink ribbon 30 that is used in the printing device 300 of the present embodiment. FIG. 4 is a longitudinal sectional view of the ink ribbon 30 that is used in the printing device 300 of the present embodiment.

The ink ribbon 30 includes a supporting layer 31 and an ink layer 32 joined on top of the supporting layer 31.

The supporting layer 31 is a layer that supports inks of the ink layer 32 and, for example, is constituted by various types of resin film having sufficient heat resistance and strength to withstand transfer.

The ink layer 32 is constituted, for example, by a yellow layer (Y layer) 321, a magenta layer (M layer) 322, and a cyan layer (C layer) 323. The yellow layer (Y layer) 321 is constituted by an yellow ink. The magenta layer (M layer) 322 is constituted by a magenta ink. The cyan layer (C layer) 323 is constituted by a cyan ink. The yellow layer 321, the magenta layer 322, and the cyan layer 323 are periodically placed on top of the supporting layer 31 along a direction parallel with the length of the ink ribbon 30 (i.e. a direction in which the ink ribbon 30 extends). A color transferred image can be printed onto the receptive layer 22 of the transfer film 20 by transferring the inks of the yellow layer 321, the magenta layer 322, and the cyan layer 323 in sequence onto the receptive layer 22 of the transfer film 20.

The transfer onto the transfer film 20 of the inks of the yellow layer 321, the magenta layer 322, and the cyan layer 323 is herein referred to as “Y printing”, “M printing”, and “C printing”, respectively.

It should be noted that the aforementioned three types of ink are not the only inks that are used. Another colored ink may be used, or only one type only two types of ink, or four or more types of ink may be used.

The printing device 300 includes an ink ribbon sending unit 35, an ink ribbon rolling unit 36, a plurality of conveying rollers 37, a thermal head 38, and a platen roller 39.

The ink ribbon sending unit 35 sends out the ink ribbon 30 downward by rotating in a direction indicated by arrow R4 in FIG. 1. The ink ribbon rolling unit 36 rolls up the ink ribbon 30 by rotating in a direction indicated by arrow R5 in FIG. 1. The conveying rollers 37 are placed at spacing in a direction of conveyance of the ink ribbon 30 between the ink ribbon sending unit 35 and the ink ribbon rolling unit 36, and guide the conveyance of the ink ribbon 30.

The thermal head 38 is placed between the ink ribbon sending unit 35 and the ink ribbon rolling unit 36 and, by heating the ink ribbon 30 from the side of the supporting layer 31 of the ink ribbon 30 while the ink ribbon 30 is being conveyed, transfers the inks of the ink layer 32 of the ink ribbon 30 onto the receptive layer 22 of the transfer film 20. The platen roller 39 is placed opposite the thermal head 38 across the ink ribbon 30 being conveyed and the transfer film 20 being conveyed, and supports the transfer film 20.

The thermal head 38 assumes an initial position (as indicated in FIG. 10A), a position in readiness for printing (as indicated in FIG. 10B), and a printing position (as indicated in FIG. 1).

The initial position is a position in which the thermal head 38 is significantly away from the platen roller 39. When the thermal head 38 assumes the initial position, the ink ribbon 30 is easily detached from a body of the printer 100. The position in readiness for printing is a position in which the thermal head 38 is closer to the platen roller 39 than in the initial position. When the thermal head 38 assumes the position in readiness for printing, the thermal head 38 can quickly shift to the printing position, which is described next. The printing position is a position in which the thermal head 38 is in contact with the platen roller 39 across the ink ribbon 30 and the transfer film 20. When the thermal head 38 assumes the printing position, the inks of the ink layer 32 of the ink ribbon 30 can be easily transferred onto the receptive layer 22 of the transfer film 20.

FIG. 5 is a front view showing the cutting unit 80 of the printer 100 of the present embodiment. FIG. 6 is a top view showing the cutting unit 80 of the printer 100 of the present embodiment. FIGS. 7A and 7B are each a top view showing an action of the cutting unit 80 of the printer 100 of the present embodiment. FIG. 7A shows a mode of cutting by a first cutting unit, and FIG. 7B shows a mode of cutting by a second cutting unit.

The cutting unit 80 includes the first cutting unit 81 and the second cutting unit 82.

The first cutting unit 81 cuts off both ends of the pasted combination of the transferee object 10 and the transfer film along the direction of conveyance of the transferee object 10. By so doing, the first cutting unit 81 makes the lengths of the transferee object 10 and the transfer film 20 uniform in the direction orthogonal to the direction of conveyance of the transferee object 10.

The second cutting unit 82 cuts the pasted combination of the transferee object 10 and the transfer film 20 along the direction orthogonal to the direction of conveyance of the transferee object 10 after the pasted combination of the transferee object 10 and the transfer film 20 has been cut by the first cutting unit 81. By so doing, the second cutting unit 82 ejects the pasted combination of the transferee object 10 and the transfer film 20 as a printed matter 40 in the form of a sheet.

The first cutting unit 81 includes two cutters 811 and a cutter rest 812. The cutters 811 are configured as rotary cutters that rotate on an axis parallel to the direction orthogonal to the direction of conveyance of the transferee object 10. The two cutters 811 are placed slightly further inward than both ends, respectively, of the transferee object 10 being conveyed. The cutter rest 812 are constituted by a roller member that rotates on an axis parallel to the direction orthogonal to the direction of conveyance of the transferee object 10. As shown in FIG. 7A, the first cutting unit 81 cuts the pasted combination of the transferee object 10 and the transfer film 20 by forming, with the cutters 811, cuts 10*a* that extend in the direction of conveyance of the transferee object 10.

The second cutting unit 82 includes a cutter 821 and a cutter rest 822. The cutter 821 is configured as a rotary cutter that freely moves along the direction orthogonal to the direction of conveyance of the transferee object 10 and that rotates on an axis parallel to the direction of conveyance of the transferee object 10. The cutter rest 822 is configured as an elongated plate member that extends in the direction orthogonal to the direction of conveyance of the transferee object 10. As shown in FIG. 7B, the second cutting unit 82 cuts the pasted combination of the transferee object 10 and the transfer film 20 by forming, with the cutter 821, a cut 10*a* that extends in the direction orthogonal to the direction of conveyance of the transferee object 10.

Next, a printed matter 40 that is obtained through the printer 100 of the present embodiment is described.

FIG. 8 is a longitudinal sectional view of a printed matter 40 of the present embodiment.

The printed matter 40 includes a transferee object 10 and a transfer film 20 joined on top of the transferee object 10. The transfer film 20 includes a transparent supporting layer 21 that transmits light and a receptive layer 22 on which a transferred image is printed. The receptive layer 22 of the transfer film 20 is located beside the transferee object 10.

Since the receptive layer 22 on which the transferred image is printed is located beside the transferee object 10, the transferred image printed on the receptive layer 22 is observed via the supporting layer 21. Therefore, the supporting layer 21 of the transfer film 20 needs to be transparent. The term "transparent" here needs only be to such an extent that the transferred image printed on the receptive layer 22 can be visually recognized. Further, the term "transparent" also encompasses "colored, transparent".

Further, since the transferred image printed on the receptive layer 22 is observed via the supporting layer 21, the printed matter 40 is given deign quality that the supporting layer 21 of the transfer film 20 possesses. For example, in a case where the supporting layer 21 of the transfer film 20 is formed by a high-gloss transparent film, the printed matter 40 too has a high gloss. Thus, the printed matter 40 has high design quality.

It should be noted that the supporting layer 21 of the transfer film 20 is not limited to one formed by a high-gloss transparent film. The supporting layer 21 may for example be one having a matte or embossed outer surface or one having a design layer joined on top of an outer surface thereof.

Next, a method for controlling a printer 100 of the present embodiment is described.

FIG. 9 is a flow chart showing the method for controlling a printer 100 of the present embodiment.

The method for controlling a printer 100 includes a printing step (S2 to S7 of FIG. 9) of printing a transferred image onto a transfer film 20 through a printing device 300 and a pasting step (S8 of FIG. 9) of pasting the transfer film 20 onto a transferee object 10. Furthermore, the method for controlling a printer 100 of the present embodiment includes a cutting step (S9 of FIG. 9) of cutting a pasted combination of the transferee object 10 and the transfer film 20.

The aforementioned printing step (S2 to S7 of FIG. 9) includes a step (S3, S5, and S7 of FIG. 9) of printing the transferred image onto the transfer film 20 while the holding unit 60 is sending out the transferee object 10 and the transfer film 20 downstream. Furthermore, the method for controlling a printer 100 of the present embodiment includes a step (S2, S4, and S6 of FIG. 9) of, before the transferred image is printed onto the transfer film 20, rewinding the transfer film 20 to a printing starting position while the holding unit 60 is sending out the transferee object 10 and the transfer film 20 upstream.

The aforementioned cutting step (S9 of FIG. 9) includes a step of cutting off both ends of the pasted combination of the transferee object 10 and the transfer film 20 along a direction of conveyance of the transferee object 10 and a step of cutting the pasted combination of the transferee object 10 and the transfer film 20 along a direction orthogonal to the direction of conveyance of the transferee object 10.

The following describes an example of the method for controlling a printer 100.

FIGS. 10A to 10G are each a front view showing an action of the printer 100 of the present embodiment.

In executing a printing process, the printer 100 first shifts from an initial state shown in FIG. 10A to a printing preparatory state shown in FIG. 10B (S1 of FIG. 9).

In the initial state, as shown in FIG. 10A, the thermal head 38 assumes the initial position, the pinch rollers 61 and 62 a retracted position, and the heat rollers 71 and 72 the stop-pressing position. In the printing preparatory state, as shown in FIG. 10B, the thermal head 38 assumes the position in readiness for printing, the pinch rollers 61 and 62 the holding position, and the heat rollers 71 and 72 the stop-pressing position.

Next, as shown in FIG. 10C, the printer 100 rewinds the transfer film 20 to a Y printing starting position where Y printing starts (S2 of FIG. 9).

The rewinding of the transfer film 20 is done by the pinch rollers 61 and 62 sending out the transfer film 20 upstream and the transfer film sending unit 25 rolling up the transfer film 20 by rotating in the −R2 direction. At this point in time, the transferee object 10 too is rewound as the transfer film 20 is rewound. The rewinding of the transferee object 10 is done by the pinch rollers 61 and 62 sending out the transferee object 10 upstream and the transferee object sending unit 15 rolling up the transferee object 10 by rotating in the −R1 direction. This rewinding of the transfer film 20 and the transferee object 10 is executed by the pinch rollers 61 and 62, the transfer film sending unit 25, and the transferee object sending unit 15 being driven in synchronization with one another.

Next, as shown in FIG. 10D, the printer 100 executes Y printing on the transfer film 20 (S3 of FIG. 9).

Prior to the Y printing, the thermal head 38 shifts from the position in readiness for printing to the printing position. Then, the pinch rollers 61 and 62 send out the transferee object 10 and the transfer film 20 downstream by rotating in the R3 direction while keeping assuming the holding position. Accordingly, the transfer film 20 is rolled out from the transfer film sending unit 25, and the transfer film 20 thus rolled out is conveyed downstream. The printer 100 uses the thermal head 38 to execute the Y printing on the transfer film 20 being conveyed downstream.

Next, as shown in FIG. 10E, the printer 100 rewinds the transfer film 20 to an M printing starting position where M printing starts (S4 of FIG. 9).

Prior to this rewinding, the thermal head 38 shifts from the printing position to the position in readiness for printing. Then, the transfer film 20 and the transferee object 10 are rewound in a manner similar to the rewinding to the Y printing starting position.

Next, the printer 100 executes M printing on the transfer film 20 in a manner similar to the Y printing (S5 of FIG. 9)

Next, in a manner similar to the rewinding to the M printing starting position, the printer 100 rewinds the transfer film 20 to a C printing starting position where C printing starts (S6 of FIG. 9)

Next, as shown in FIG. 10F, the printer 100 executes C printing on the transfer film 20 in a manner similar to the Y printing and the M printing (S7 of FIG. 9).

Next, the printer 100 pastes the transfer film 20 onto the transferee object 10 by pressing the transfer film 20 against the transferee object 10 in the presence of the application of heat (S8 of FIG. 9). This pasting of the transfer film 20 onto the transferee object 10 is executed at the same time as the C printing as shown in FIG. 10F.

Prior to this pasting of the transfer film 20 onto the transferee object 10, the heat rollers 71 and 72 shift from the stop-pressing position to the pressing position. Then, the heat rollers 71 and 72, which are in the pressing position, paste the transfer film 20 onto the transferee object 10 by pressing the transferee object 10 and the transfer film 20 against each other in the presence of the application of heat while the transferee object 10 and the transfer film 20 are being sent out by the pinch rollers 61 and 62.

Next, as shown in FIG. 10G, the printer 100 conveys a pasted combination of the transferee object 10 and the transfer film 20 to the cutting unit 80, which then cuts the pasted combination of the transferee object 10 and the transfer film 20 and ejects a printed matter 40 (S9 of FIG. 9).

Prior to this ejection of the printed matter 40, the thermal head 38 shifts from the printing position to the position in readiness for printing, and the heat rollers 71 and 72 shift from the pressing position to the stop-pressing position. The pinch rollers 61 and 62 send out the transferee object 10 and the transfer film 20 downstream by rotating in the R3 direction while keeping assuming the holding position. Accordingly, the pasted combination of the transferee object 10 and the transfer film 20 is conveyed downstream.

Finally, the printer 100 returns to the initial state shown in FIG. 10A (S10). It should be noted that in continuing to execute the printing process, the printer 100 does not return to the initial state shown in FIG. 10A but returns to the position in readiness for printing shown in FIG. 10B and then repeats the same control.

Next, a method for manufacturing a printed matter 40 of the present embodiment is described.

The printed matter 40 is manufactured, for example, by controlling a printer 100 of the present embodiment by the aforementioned control method.

That is, the printed matter 40 is manufactured using a printer 100 including a transferee object sending unit 15, a transfer film sending unit 25, a printing device 300, a holding unit 60, and a pasting unit 70. Note here that the transferee object sending unit 15 is a unit configured to send out a transferee object 10 downward. The transfer film sending unit 25 is a unit configured to send out a transfer film 20 downstream. The printing device 300 is a unit situated downstream of the transfer film sending unit 25 and configured to print a transferred image onto the transfer film 20. The holding unit 60 is a unit situated downstream of the transferee object sending unit 15 and the printing device 300 and configured to hold the transferee object 10 and the transfer film 20 on top of each other so that a surface of the transfer film 20 on which the transferred image is printed faces the transferee object 10. The pasting unit 70 is a unit situated downstream of the holding unit 60 and configured to paste the transfer film 20 onto the transferee object 10.

Moreover, the method for manufacturing a printed matter 40 includes a printing step (S2 to S7 of FIG. 9) of printing the transferred image onto the transfer film 20 through the printing device 300 and a pasting step (S8 of FIG. 9) of pasting the transfer film 20 onto the transferee object 10 with the transferred image printed on the transfer film 20 by the pasting unit 70. Furthermore, the method for manufacturing a printed matter 40 of the present embodiment includes a cutting step (S9 of FIG. 9) of cutting a pasted combination of the transferee object 10 and the transfer film 20.

The aforementioned printing step (S2 to S7 of FIG. 9) includes a step (S3, S5, and S7 of FIG. 9) in which the printing device 300 prints the transferred image onto the transfer film 20 while the holding unit 60 is sending out the transferee object 10 and the transfer film 20 downstream. Furthermore, the method for manufacturing a printed matter 40 of the present embodiment includes a step (S2, S4, and S6 of FIG. 9) of, before the transferred image is printed onto the transfer film 20, rewinding the transfer film 20 to a printing starting position while the holding unit 60 is sending out the transferee object 10 and the transfer film 20 upstream.

The aforementioned cutting step (S9 of FIG. 9) includes a step of cutting off both ends of the pasted combination of the transferee object 10 and the transfer film 20 along a direction of conveyance of the transferee object 10 and a step of cutting the pasted combination of the transferee object 10 and the transfer film 20 along a direction orthogonal to the direction of conveyance of the transferee object 10.

As described above, a printer 100 of the present embodiment includes a transferee object sending unit 15, a transfer film sending unit 25, a printing device 300 situated downstream of the transfer film sending unit 25, a holding unit 60 situated downstream of the transferee object sending unit 15 and the printing device 300, and a pasting unit 70 situated downstream of the holding unit 60.

Further, a method for controlling a printer 100 of the present embodiment includes a printing step of printing a transferred image onto a transfer film 20 through a printing device 300 and a pasting step of pasting the transfer film 20 onto a transferee object 10, and the printing step includes a step of printing the transferred image onto the transfer film 20 while a holding unit 60 is sending out the transferee object 10 and the transfer film 20 downstream.

Such a printer 100 makes it possible to obtain a printed matter 40 of high design quality configured such that a transferred image is observed via a supporting layer 21 of a transfer film 20.

While an example of an embodiment of the present invention has been described above, the present disclosure is not limited to the aforementioned embodiment but can be changed in various ways without departing from the scope of the claims.

REFERENCE SIGNS LIST

100 Printer
10 Transferee object
10*a* Cut
15 Transferee object sending unit
20 Transfer film
21 Supporting layer
22 Receptive layer
25 Transfer film sending unit
300 Printing device
30 Ink ribbon
31 Supporting layer
32 Ink layer
321 Yellow layer (Y layer)
322 Magenta layer (M layer)
323 Cyan layer (C layer)
35 Ink ribbon sending unit
36 Ink ribbon rolling unit
37 Conveying roller
38 Thermal head
39 Platen roller
40 Printed matter
60 Holding unit
61, 62 Pinch roller
70 Pasting unit
71, 72 Heat roller
80 Cutting unit
81 First cutting unit
811 Cutter
812 Cutter rest
82 Second cutting unit
821 Cutter
822 Cutter rest
90 Control unit

The invention claimed is:

1. A printer comprising:

a transferee object sending unit configured to send out a transferee object downstream;

a transfer film sending unit configured to send out a transfer film downstream;

a printing device situated downstream of the transfer film sending unit and configured to print a transferred image onto the transfer film;

a holding unit situated downstream of the transferee object sending unit and the printing device and configured to hold the transferee object and the transfer film on top of each other so that a surface of the transfer film on which the transferred image is printed faces the transferee object and to send out the transferee object and the transfer film downstream; and a pasting unit situated downstream of the holding unit and configured to paste the transfer film onto the transferee object with the transferred image printed on the transfer film, wherein the holding unit includes two paired pinch rollers placed opposite each other, and the two paired pinch rollers assume a holding position, which is a position in which the pinch rollers hold the transferee object and the transfer film on top of each other, and a stop-holding position, which is a position in which the pinch rollers stop holding the transferee object and the transfer film.

2. The printer according to claim 1, wherein the holding unit is able to send out the transferee object and the transfer film upstream as well as downstream.

3. The printer according to claim 1, further comprising a cutting unit configured to cut off both ends of a pasted combination of the transferee object and the transfer film along a direction of conveyance of the transferee object and then cutting the pasted combination of the transferee object and the transfer film along a direction orthogonal to the direction of conveyance of the transferee object.

4. The printer according to claim 1, wherein the pasting unit includes two paired heat rollers placed opposite each other.

5. A method for manufacturing a printed matter using a printer including a transferee object sending unit configured to send out a transferee object downstream, a transfer film sending unit configured to send out a transfer film downstream, a printing device situated downstream of the transfer film sending unit and configured to print a transferred image onto the transfer film, a holding unit situated downstream of the transferee object sending unit and the printing device and configured to hold the transferee object and the transfer film on top of each other so that a surface of the transfer film on which the transferred image is printed faces the transferee object, and a pasting unit situated downstream of the holding unit and configured to paste the transfer film onto the transferee object, the method comprising:

a printing step of printing the transferred image onto the transfer film through the printing device; and a pasting step of pasting the transfer film onto the transferee object with the transferred image printed on the transfer film by the pasting unit, wherein the printing step includes a step in which the printing device prints the transferred image onto the transfer film while the holding unit is sending out the transferee object and the transfer film downstream, and wherein the holding unit includes two paired pinch rollers placed opposite each other, and the two paired pinch rollers assume a holding position, which is a position in which the pinch rollers hold the transferee object and the transfer film on top of each other, and a stop-holding position, which is a position in which the pinch rollers stop holding the transferee object and the transfer film.

6. The method according to claim 5, wherein the printing step further includes a step of, before the transferred image is printed onto the transfer film, rewinding the transfer film to a printing starting position while the holding unit is sending out the transferee object and the transfer film upstream.

7. The method according to claim 5, further comprising a cutting step of cutting a pasted combination of the transferee object and the transfer film, wherein the cutting step includes a step of cutting off both ends of the pasted combination of the transferee object and the transfer film along a direction of conveyance of the transferee object, and a step of cutting the pasted combination of the transferee object and the transfer film along a direction orthogonal to the direction of conveyance of the transferee object.

* * * * *